United States Patent
Childs

(10) Patent No.: US 10,594,217 B2
(45) Date of Patent: Mar. 17, 2020

(54) ASYMMETRIC TWO-STAGE DC-DC SWITCHING CONVERTER

(71) Applicant: Dialog Semiconductor (UK) Limited, London (GB)

(72) Inventor: Mark Childs, Swindon (GB)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/278,492

(22) Filed: Sep. 28, 2016

(65) Prior Publication Data

US 2018/0091055 A1    Mar. 29, 2018

(51) Int. Cl.
  *H02M 3/158*   (2006.01)
  *H02M 1/14*   (2006.01)
  (Continued)

(52) U.S. Cl.
  CPC ........... *H02M 3/1582* (2013.01); *H02M 1/14* (2013.01); *H02M 1/36* (2013.01); *H02M 3/1584* (2013.01);
  (Continued)

(58) Field of Classification Search
  CPC .. H02M 3/158; H02M 3/1584; H02M 3/1588; H02M 2001/0032;
  (Continued)

(56) References Cited

U.S. PATENT DOCUMENTS 4,194,147 A  *  3/1980  Payne ...................... H02M 3/10
                                                              307/53
4,359,679 A  *  11/1982  Regan ............... H02M 7/53846
                                                              323/272
(Continued)

FOREIGN PATENT DOCUMENTS

DE    10 2013 114 436    8/2014

OTHER PUBLICATIONS

Co-pending U.S. Appl. No. 14/052,844, filed Oct. 14, 2013, "Asymmetric Inductors in Multi-Phase DCDC Converters," by Andrew Repton et al, 21 pgs.
(Continued)

*Primary Examiner* — Gary L Laxton
(74) *Attorney, Agent, or Firm* — Saile Ackerman LLC; Stephen B. Ackerman

(57) ABSTRACT

An asymmetric two-stage DC-DC switching converter, using multi-stage phases, in parallel to single-stage phases, to supply an output voltage, is described. An intermediate voltage supply is used to provide supply to some second-stage phases. Several different silicon dies are used to implement a multi-phase DC-DC switching converter, where different phases are located on different dies, and different silicon processes are used to implement the different dies. The silicon die containing the faster phases, and the fast-response control circuitry, is placed closer to the load, than the silicon die containing the slower phases, and the larger value inductors. A single control signal is used to control all the single-stage and second-stage phases. A way of implementing a control scheme for the second-stage phases that allows them to operate independently from the first-stage phases, but still regulate correctly in the DC-DC switching converter system, is described. Specifically details are provided how offsets between the first-stage and second-stage systems can be reduced or eliminated, with an optional auto-calibration routine.

42 Claims, 12 Drawing Sheets

(51) Int. Cl.
*H02M 1/36* (2007.01)
*H02M 1/00* (2006.01)

(52) U.S. Cl.
CPC .............. *H02M 2001/007* (2013.01); *H02M 2001/008* (2013.01)

(58) Field of Classification Search
CPC ... H02M 2001/0067; H02M 2001/007; H02M 2001/0083
See application file for complete search history.

(56) References Cited

U.S. PATENT DOCUMENTS

| | | | | |
|---|---|---|---|---|
| 5,883,797 | A * | 3/1999 | Amaro | ............... H02J 1/102 323/268 |
| 6,362,608 | B1 | 3/2002 | Ashburn et al. | |
| 6,650,556 | B2 | 11/2003 | Dinh et al. | |
| 6,839,252 | B2 | 1/2005 | Tai | |
| 7,092,266 | B2 * | 8/2006 | Frank | ............... G05F 1/70 363/65 |
| 7,183,724 | B2 | 2/2007 | Ball | |
| 7,696,735 | B2 | 4/2010 | Oraw et al. | |
| 8,417,980 | B1 * | 4/2013 | Mimberg | ............... G06F 1/26 323/234 |
| 8,493,039 | B2 | 7/2013 | Guo | |
| 8,772,967 | B1 | 7/2014 | Ikriannikov et al. | |
| 2006/0212138 | A1 | 9/2006 | Zhang | |
| 2006/0290332 | A1 | 12/2006 | Condito | |
| 2014/0232368 | A1 * | 8/2014 | Dally | ............... H02M 3/155 323/311 |
| 2015/0097542 | A1 | 4/2015 | Repton et al. | |
| 2015/0115917 | A1 | 4/2015 | Yu et al. | |
| 2016/0248327 | A1 * | 8/2016 | Li | ............... H02M 3/1584 |

OTHER PUBLICATIONS

Co-pending U.S. Appl. No. 15/189,210, filed Jun. 22, 2016, "Hybrid Buck," by Mark Childs, 24 pgs.
Co-pending U.S. Appl. No. 15/214,821, filed Jul. 20, 2016, "Regulation of a Multiple Stage Switch Mode Power Converter Through an Intermediate Voltage Control," by Mark Childs, 48 pgs.
Co-pending U.S. Appl. No. 15/263,732, filed Sep. 13, 2016, "Multiphase DCDC Converter with Asymmetric GM," by Mark Childs, 26 pgs.
"Two-Stage Power Conversion Architecture Suitable for Wide Range Input Voltage," by Seungbum Lim et al, IEEE Transactions on Power Electronics, Feb. 2015, pp. 1-12.
"Feed-Forward based Control in a DC-DC Converter of Asymmetric Multistage Stacked Boost Architecture," by Georgios Mademlis et al, IEEE Transactions on Power Electronics, vol. PP Issue: 99 , Mar. 16, 2016, pp. 1-10.
"A Multistage Interleaved Synchronous Buck Converter With Integrated Output Filter in 0.18 μm SiGe Process," by Siamak Abedinpour et al, IEEE Transactions on Power Electronics, vol. 22, No. 6, Nov. 2007, pp. 2164-2175.
"Asymmetrical Interleaved DC/DC Switching Converters for Photovoltaic and Fuel Cell Applications6—Part 1: Circuit Generation, Analysis and Design," by Eliana Arango et al, Energies 2012, 5(11), 4590-4623; doi: 10.3390/en5114590, ISSN 1996-1073, Aug. 6, 2012.
German Offide Actio, File No. 10 2016 222 191.4, Applicant: Dialog Semidonductor (UK) Limited dated Aug. 9, 2017, 5 pgs and English language translation, 4 pgs.

* cited by examiner

ASYMMETRIC TWO-STAGE DC-DC SWITCHING CONVERTER

RELATED PATENT APPLICATIONS

This application is related to U.S. patent application Ser. No. 14/052,844, filed on Oct. 14, 2013, assigned to the same assignee as the present invention, and incorporated herein by reference in its entirety, to U.S. patent application Ser. No. 15/189,210, filed on Jun. 22, 2016, assigned to the same assignee as the present disclosure, and incorporated herein by reference in its entirety, to U.S. patent application Ser. No. 15/263,732, filed on Sep. 13, 2016, assigned to the same assignee as the present disclosure, and incorporated herein by reference in its entirety, and to U.S. patent application Ser. No. 15/214,821, filed on Jul. 20, 2016, assigned to the same assignee as the present disclosure, and incorporated herein by reference in its entirety.

BACKGROUND

Field

The disclosure relates generally to a DC-DC switching power converter, employing multiple stages and multiple phases.

Description of Related Art

Asymmetric switching converter architectures have been presented in related patent application Ser. No. 14/052,844, Ser. No. 15/189,210, and Ser. No. 15/263,732. These architectures provide benefits by optimizing different phases for different operating conditions and then controlling which phases are operated depending on the load condition.

For example patent application Ser. No. 14/052,844 describes how different inductors can be chosen to provide either better efficiency at low load, or higher performance (load transient response) for high loads. By only operating the high efficiency phases at low loads, and all phases at high loads, a switching converter can be made which has very high efficiency across a wide range of loads, and also improved load transient performance.

Patent application Ser. No. 15/189,210 shows how peak-mode phases and valley-mode phases may be combined to simplify the implementation of low-load discontinuous-mode, while allowing faster switching frequencies for the high-load phases, than would be possible using peak-mode architecture.

However, at higher switching frequencies, there is a severe efficiency penalty caused by the switching losses.

SUMMARY

An object of the disclosure is to provide an asymmetric two-stage DC-DC switching power converter with very high low-load efficiency and extremely high transient response at high-load.

Further, another object of this disclosure is the design of a two-stage DC-DC switching power converter that combines low switching frequency single-stage phases for low-load operation, and high switching frequency two-stage phases for high-load operation.

Still, another object of this disclosure is to control the second-stage phases of a DC-DC switching power converter with little or no information from the rest of the system, such that the second-stage phases operate effectively, disabling at low loads, and ramping their output current up smoothly, as the switching converter load is increased.

Still, another object of this disclosure is to control the second-stage phases of a DC-DC switching power converter using a separate control scheme from the first stage phases, operating the switching converter with finite DC output impedance, and providing current from local and remote phases, with good control over the relative currents from each phase.

A still further object is to auto-calibrate the second stage-phases of a DC-DC switching power converter during startup to remove any offsets in the system, allowing local and remote control loops to be used together without issue, and to use either the output voltage of the switching converter just after startup, or the intermediate voltage, as a reference voltage against which the second-stage phases are calibrated, and providing a window during which auto-calibration is completed.

To accomplish the above and other objects, a DC-DC switching converter is disclosed, comprised of a Buck, Boost, or Buck-Boost, configured for more than one phase of operation. The switching converter requires that some of the phases operate as a single-stage, regulating directly from the supply voltage down to the output voltage. The switching converter requires that some of the phases operate in a two-stage, or multi-stage, configuration regulating to an intermediate voltage, and then down to the output voltage. The switching converter is configured for single-stage phases operating at low switching frequencies and low loads. The switching converter is configured for two-stage phases operating at high switching frequencies and high loads. Optional auto-calibration is configured, to match the references of different stages, whether single stage or multi-stage, for a seamless multi-phase operation, when all the phases of all the stages are combined to deliver current.

The above and other objects are further achieved by a method for operating an asymmetric two-stage DC-DC switching converter. The steps include providing more than one phase, where one or more multi-stage phases, are in parallel with one or more single-stage phases. A single control signal controls the single-stage and multi-stage phases. An intermediate voltage, between a first and second stage of one or more multi-stage phases, is provided. Optional auto-calibration of the second-stage phases during startup, removes any offsets in the system.

In various embodiments, the objects may be achieved by implementing a number of single-stage phases, some using peak-mode and some using valley-mode control, with some of two-stage phases operating from a single first-stage phase providing a common intermediate voltage, and a further two-stage phase operating from another first-stage phase providing a separate intermediate voltage.

In various embodiments, the objects may be achieved by implementing a single first-stage switching converter providing an intermediate output voltage rail to multiple second-stage switching converters, where the second-stage switching converters are partitioned to provide power to different regulated outputs.

In various embodiments, the objects may be achieved by implementing a control signal that is a single-ended voltage, a single-ended current, or a number of currents one for each phase to be controlled.

In various embodiments, the objects may be achieved by implementing the output voltage of the DC-DC switching converter as a reference voltage against which the second-stage phases are calibrated to remove any offsets in the system.

In various embodiments, the objects may be achieved by implementing the intermediate voltage of the DC-DC switching converter as a reference voltage against which the second-stage phases are calibrated to remove any offsets in the system.

DETAILED DESCRIPTION

An asymmetric two-stage DC-DC switching power converter with very high low-load efficiency and extremely high transient response at high-load is proposed. The proposal combines low-switching frequency single-stage phases, for low load operation, with high-switching frequency two-stage phases, for high load operation.

The advantage of asymmetrical multiphase converter architecture is that each phase type is optimized for a narrower operating condition. This allows for improved system performance and operating efficiency. The proposal highlights the benefits of adding a dual-stage switching converter stage(s) in parallel with a single-stage switching converter stage(s), within the asymmetrical multiphase converter architecture. In general, the dual stage phase consists of a lower frequency first stage, responsible of stepping down the input voltage to an intermediate voltage rail. The second stage is a high frequency switching converter responsible for stepping down the intermediate voltage to a regulated output voltage desired by the load.

Figure 1:
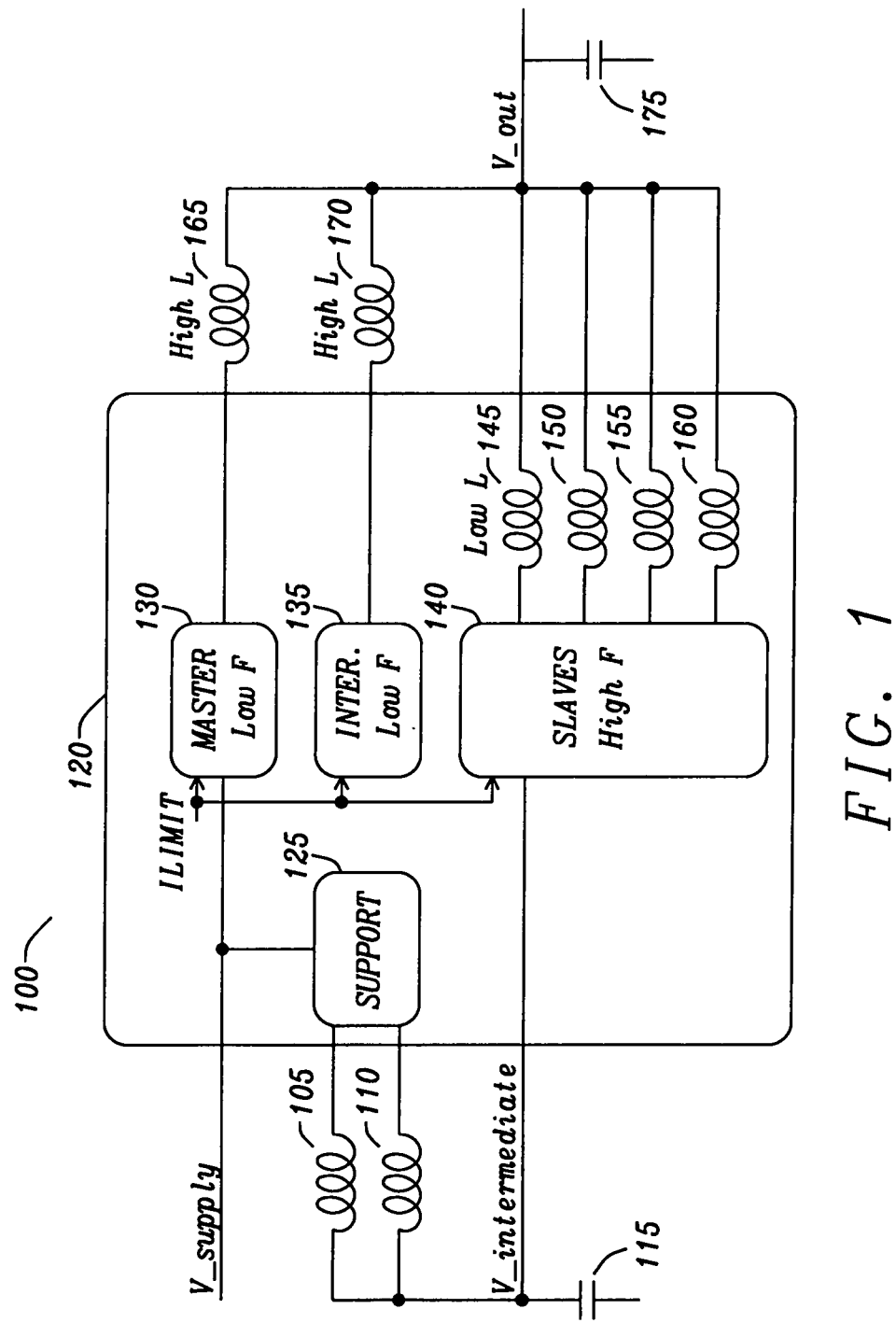
FIG. 1 illustrates two single-stage phases operating at low load conditions, and a set of very fast phases operating at high load conditions, operated from a lower value intermediate voltage, provided by a first-stage Buck switching converter, embodying the principles of the disclosure.

FIG. 1 illustrates 100, two single-stage phases operating at low load conditions, and a set of very fast phases operating at high load conditions, operated from a lower value intermediate voltage, provided by a first-stage Buck switching converter, embodying the principles of the disclosure. The asymmetrical multiphase converter architecture provides improved over-all system performance by providing optimized phases, for specific operating conditions and by controlling which phases are active based on the current operating conditions. In the case of dual-stage phases, the principle benefit is the lower ratio between the intermediate voltage rail V_INTERMEDIATE across capacitor 115, and the final regulated output voltage V_OUT across capacitor 175, allowing the second-stage switching converter to operate at a greater switching frequency due to the higher ON-time to OFF-time duty cycle. The major benefits of high frequency switching are improved dynamic load response, smaller inductor values and filter components, and improved output ripple characteristics.

In 120, two single-stage phases, MASTER 130 and INTER 135, operate at low load conditions. MASTER 130 operates from supply V_SUPPLY, and INTER 135. They typically operate at relatively low switching frequencies, and with relatively large value inductors 165 and 170. A set of very fast phases, SLAVES 140, is then operated only at high load conditions. These are operated at much higher switching frequencies and with much smaller value inductors 145, 150 155, and 160. SLAVES 140 control is from lower value intermediate voltage, V_INTERMEDIATE, regulated down from V_SUPPLY, through first stage switching converter SUPPORT 125, and inductors 105 and 110.

The coordination between the control elements of the switching converter phases may be carried forward in regards to the dual-stage phases. The same control signal that controls the output of the single-stage phases may provide the control for the second stage of the two-stage phases. For example, if the switching converter is operated using peak-current mode control, the same peak-current signal may be used for all the single-stage phases and for all the second stages of the two-stage phases.

However, for the dual stage phases, the control elements include the control elements of both the first-stage and second-stage switching converters. For example the intermediate voltage rail, output of the first switching converter stage, may be increased or decreased, depending on the current operating condition.

Figure 2:
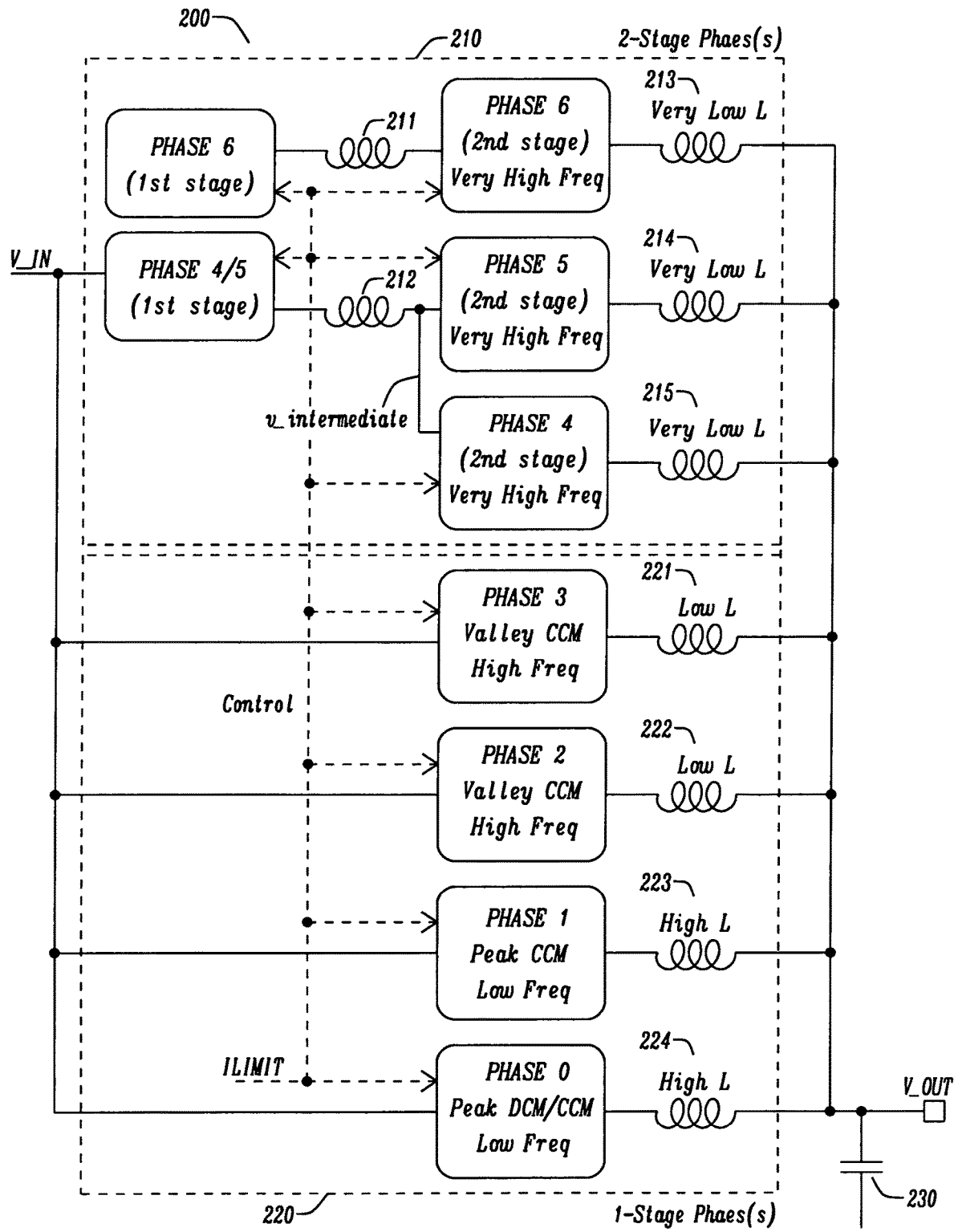
FIG. 2 shows a more general implementation, embodying the principles of the disclosure.

FIG. 2 shows a more general implementation in 200, embodying the principles of the disclosure. In 220, a number of single-stage phases are provided, some using peak-mode and some using valley-mode control, using a variety of frequencies and inductor values, as further described in related patent application Ser. No. 15/189,210. PHASE 0 and PHASE 1 typically operate at relatively low switching frequencies, and with relatively large value inductors 224 and 223. PHASE 2 and PHASE 3 typically operate at much higher switching frequencies and with much smaller value inductors 222 and 221. PHASE 0, PHASE 1, PHASE 2, and PHASE 3 operate from supply V_IN.

In 210, a pair of two-stage phases are provided in PHASE 4 and PHASE 5, operating from a single first-stage phase PHASE 4/5, providing a common intermediate voltage V_INTERMEDIATE across inductor 212. PHASE 4 and PHASE 5 typically operate at very high switching frequencies and very small value inductors 215 and 214. A further two-stage phase is also provided in PHASE 6 which operates from another first-stage, providing a separate intermediate voltage across inductor 211. PHASE 4/5 operates from supply V_IN, and output voltage V_OUT is across capacitor 230.

Throughout the present disclosure, the use of low, high, and very high refers to switching frequencies, inductor sizes, and the like, and is meant to be in comparison to other components of the same type, such as converter phases or stages, or inductors, that are connected to other phases or stages, in the same system.

Figure 3:
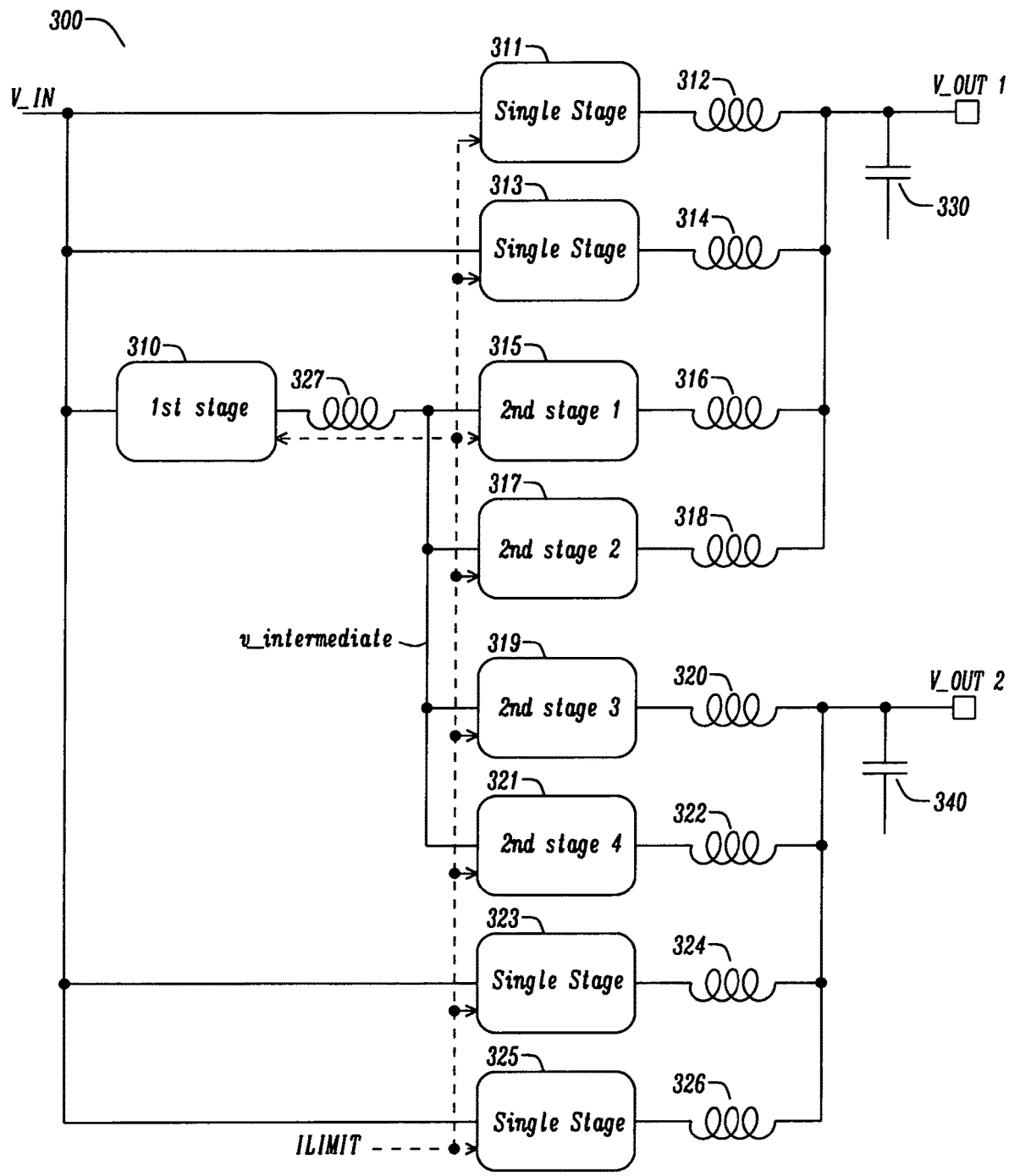
FIG. 3 illustrates a single first-stage Buck switching converter providing an intermediate output voltage rail to multiple second-stage high frequency Buck switching converters, embodying the principles of the disclosure.

FIG. 3 300 illustrates a single first-stage Buck switching converter providing an intermediate output voltage rail to multiple second-stage high frequency Buck switching converters, embodying the principles of the disclosure. Input voltage V_IN supplies first-stage 310, which in turn provides a common intermediate voltage V_INTERMEDIATE across inductor 327, to second stages 315, 317, 319, and 321. Input voltage V_IN also supplies single-stage phases 311, 313, 323, and 325.

V_OUT1 is provided through inductors 312 and 314, from single-stages 311 and 313 respectively, and V_OUT2 through inductors 324 and 326, from single-stages 323 and 325. Second-stage buck converters, 315, 317, 319, and 321, are partitioned to provide power to different regulated outputs. V_OUT1 is provided through inductors 316 and 318, from second stages 315 and 317 respectively, and V_OUT2 through inductors 320 and 322, from second stages 319 and 321. As is often the case, several multi-phase converters are used to provide multiple regulated outputs.

Communication is provided between the control elements of each of the switching converters. In some cases, the load devices require the multi-phase switching converter to respond to extreme operating conditions, such as dynamic load, and system limitations, such as component height limitation. There may be advantages to segmenting the various elements of the asymmetrical multi-phase switching converters at different physical locations of the end system.

Figure 4:
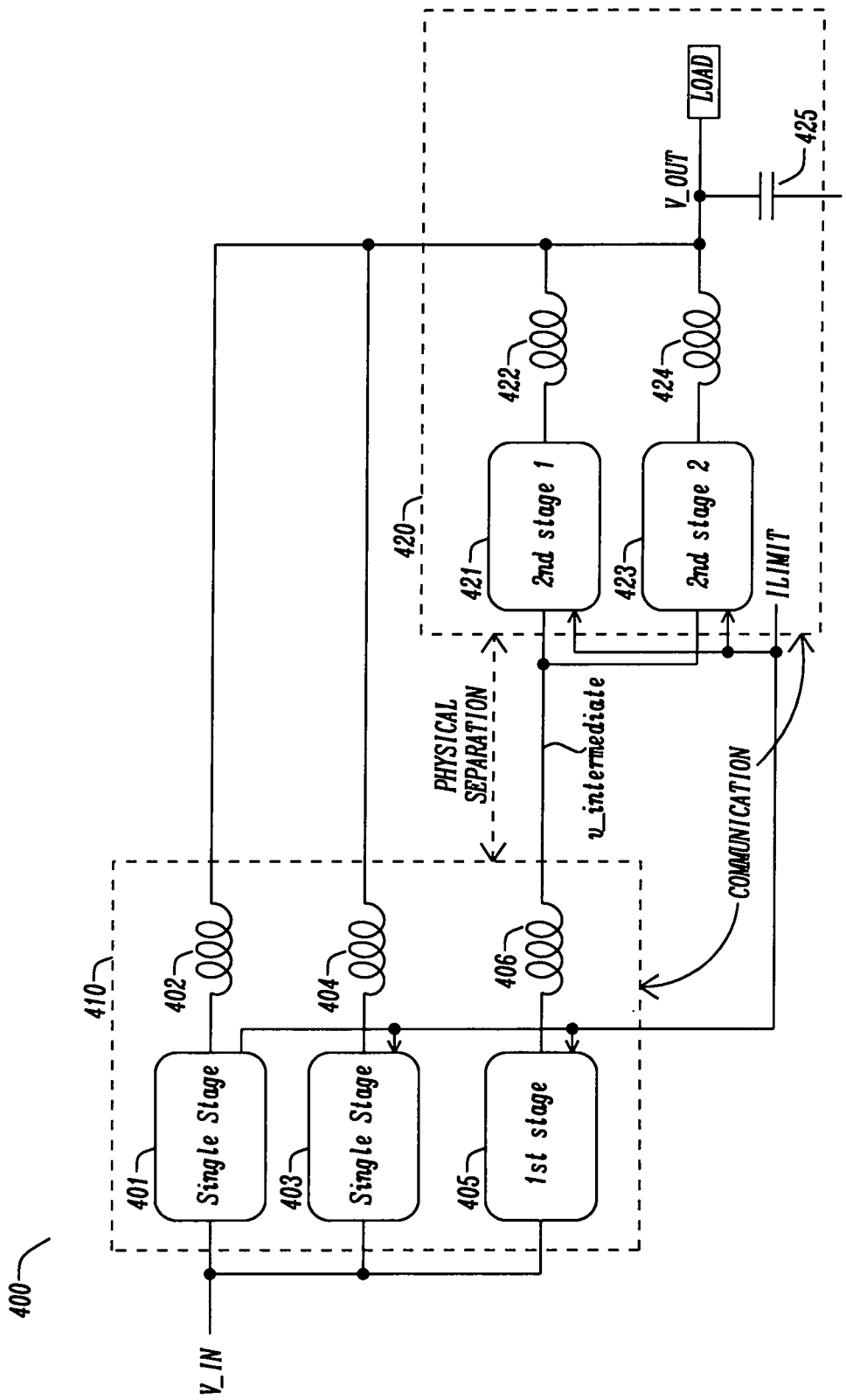
FIG. 4 shows a system where at least some of the second-stage phases are located remotely from the single-stage and first-stage phases, embodying the principles of the disclosure.

FIG. 4 shows system 400, where at least some of the second-stage phases are located remotely from the single-stage and first stage phases, embodying the principles of the disclosure. In 410, input voltage V_IN supplies first-stage phase 405, which in turn supplies second stages 421 and 423, with a common intermediate voltage V_INTERMEDIATE across inductor 406. Input voltage V_IN also supplies single-stage phases 401 and 403, which in turn provide V_OUT across inductors 402 and 404, respectively. V_OUT is read at capacitor 425 and the point of the load.

Second-stage phases 420 are located remotely from single-stage and first stage phases 410. It may be advantageous to locate high frequency second-stage phases 421 and 423, and their respective inductors 422 and 424, away from the switching converter first stage phase, and in close proximity to the actual load device. Note that V_OUT is also read at inductors 422 and 424, at capacitor 425 and the point of the load.

The physical separation of the high frequency second stage from the rest of the power converter system provides unique challenges to the communication between the control elements of the system. In the proposal, all single phase, first-stage, and second-stage phases are controlled by a single control signal. It is beneficial to locate the control signal in a remote die of the system, as this die receives information with the highest bandwidth for the high frequency second stages. Information at the local die must pass through a length of track or wire, which is likely to act as a filter and add delay to any information the control signal receives. In FIG. 4, stages 410 could be located in a local die, with stages 420 in a remote die, as described above.

It is beneficial for any control signal to be transmitted as a dual-ended, differential, signal as this is more immune to noise injection. It is also beneficial to add any fast output detection at the remote location. For example, a fast comparator may be used to monitor the output voltage. If the output voltage falls suddenly or falls outside the normal regulation window, then the comparator flags this and the switching converter responds quickly in some way. If this fast response system is used, then it is beneficial for the control signal to be implemented at the remote location.

Of particular importance is the concept of a common control signal for all phases. If the efficiency of the whole system is to be optimized, it is important to control the relative currents and transconductance of all phases together. It is important to keep the efficiency of each of the phases roughly similar, in order not to let any phase drag down the overall efficiency of the entire switching converter. In order to do this, it is beneficial to arrange for all phases to reach their maximum output current at the same operating point, as in U.S. patent application Ser. No. 15/263,732, filed on Sep. 13, 2016, assigned to the same assignee as the present disclosure, and incorporated herein by reference in its entirety.

In order to achieve this, the remote phases must have information about the state of the local phases and vice-versa. This is most conveniently achieved by using a common control signal for all single-stage, first-stage, and second-stage phases. Prior to the disclosure, it is hard to achieve this with any architecture that does not include redundant circuitry, requiring significant interconnecting signals, preventing maximized efficiency. It is beneficial to minimize the amount of interconnect between the phases, and reduce the amount of wires and information that must be passed between the different phases.

Figure 5:
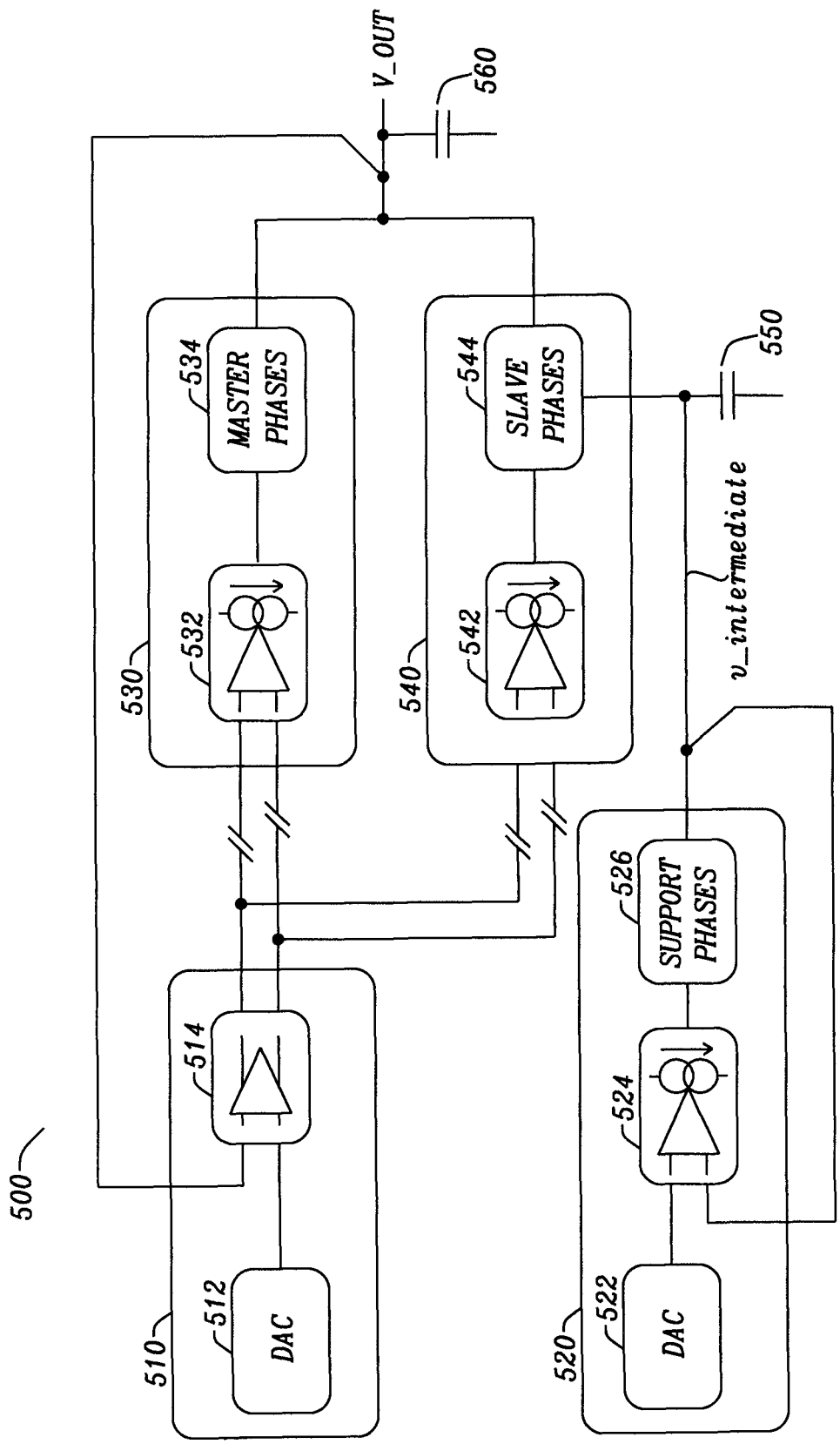
FIG. 5 illustrates a common control signal system, with a DAC and amplifier providing the control signal to all phases, distributed as a dual-ended voltage signal, embodying the principles of the disclosure.

FIG. 5 illustrates a common control signal system 500, with a DAC and amplifier providing a control signal to all phases, distributed as a dual-ended voltage signal, embodying the principles of the disclosure. Control block 510 is comprised of DAC 512 and amplifier 514. The amplifier implements the basic control loop, setting the overall transconductance of the system and the main response shaping. Other ways of distributing the control signal are possible, such as a single-ended voltage, a single ended current, or a number of currents one for each phase to be controlled.

The important aspect is that control block 510 is responsible for keeping all phases controlled with a common dual-ended control signal. This logic may be implemented in either the remote die with SLAVE 540, or the local die with MASTER 530, or in a separate location such as SUPPORT 520. SUPPORT 520 operates from separate DAC 522, providing intermediate voltage, V_INTERMEDIATE across capacitor 550, and is comprised of first stage switching converter 524 and SUPPORT PHASES logic 526. Local MASTER 530 operates from DAC 512 at low load conditions and low switching frequencies, providing output voltage V_OUT across capacitor 560, and is comprised of switching converter 532, and MASTER PHASES logic 534. Remote SLAVE 540 operates from DAC 512 at high load conditions and higher switching frequencies, providing output voltage V_OUT across capacitor 560, and is comprised of switching converter 542, and MASTER PHASES logic 544.

In the case where the second-stage phases are physically located remotely from the single-stage and first stage phases, the switching converter may be implemented using two different silicon technologies. This may be particularly advantageous if the silicon process of the die containing the single-stage phases is unable to support the switching frequencies of the second-stage phases. In this case, the process is asymmetric, and optimized for the phases that it supports.

Figure 6:
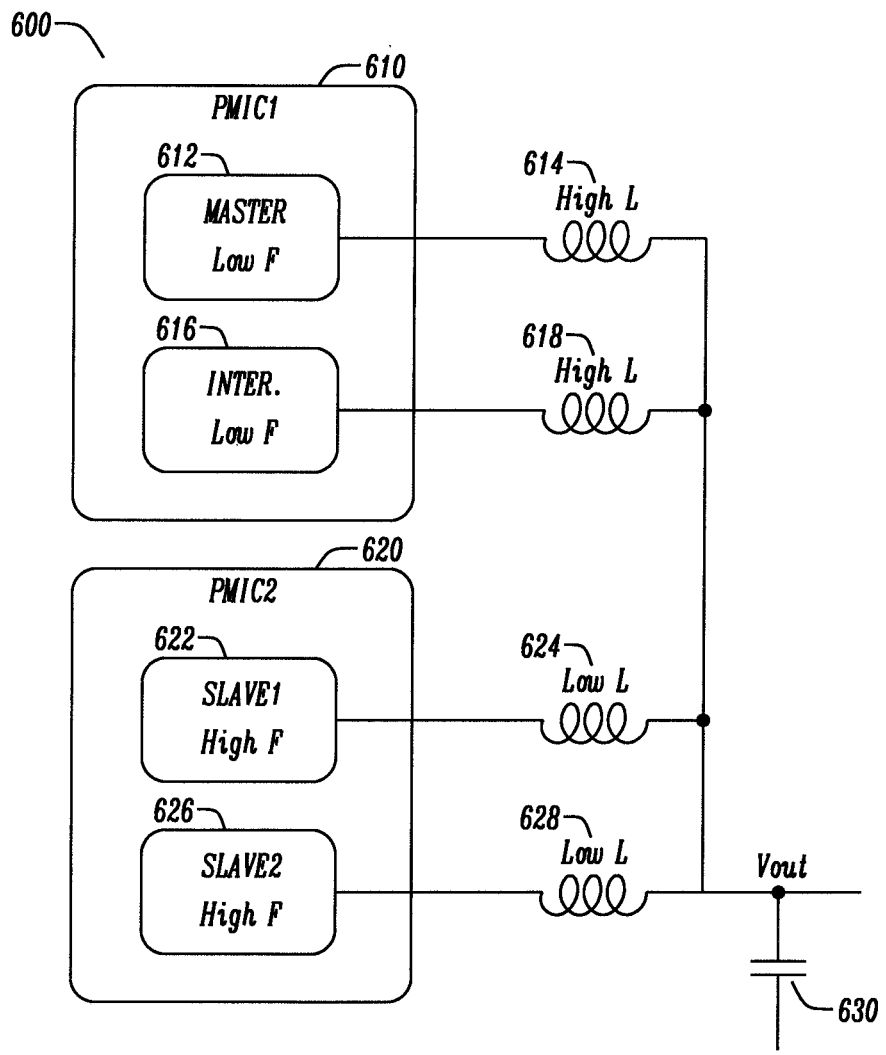
FIG. 6 shows a system where at least some of the phases are located on a separate silicon die, allowing each part of the switching converter to be optimized for operating conditions, embodying the principles of the disclosure.

FIG. 6 shows system 600, where at least some of the phases are located on a separate silicon die, allowing each part of the switching converter to be optimized for operating conditions, embodying the principles of the disclosure. In this system, it is expected that PMIC1 610, which contains MASTER 612 configured to inductor 614, and intermediate phases INTER 616 configured to inductor 618, for low load conditions and large value inductors, is implemented using a slow, large-feature size and cheap process. It is likely that this process is not suitable for, or cannot support, the high switching frequency of the slave phases.

It is then expected that PMIC2 620, which contains slave phases SLAVE1 622 configured to inductor 624, and SLAVE2 626 configured to inductor 628, for higher switching frequencies and much smaller value inductors, is implemented using a faster, small-feature size and expensive process. Output voltage V_OUT, of the asymmetric two-stage switching converter, is across capacitor 630.

The present disclosure describes a way of implementing a control scheme for the remote phases that allows them to operate independently from the main phases, and still regulate correctly in the switching converter system. Specifically the disclosure details how offsets between the remote and main phases can be reduced or eliminated.

The remote phases can be controlled with little or no information from the rest of the system, such that the remote phases operate effectively, disabling at low loads, and ramping their output current up smoothly, as the switching converter load is increased. The remote phases of the disclosure use a separate control scheme from the local phases, operating the switching converter with finite DC output impedance, and providing current from local and remote phases, with good control over the relative currents from each phase. The remote phases can be auto-calibrated during startup to remove any offsets in the system, allowing local and remote control loops to be used together without issue, and using either the output voltage of the switching converter just after startup, or the intermediate voltage, as a reference voltage against which the remote phases are calibrated, providing a window during which auto-calibration is completed.

The system requires that the control signal, in this case a dual-ended differential voltage, be routed between the local and remote phase locations in the switching converter. The interconnect may be difficult given the application, and the ability to run the remote phases as a separate system is highly desirable.

The preferred embodiment is operating a switching converter with multiple phases. Some of these phases are single-stage and some of the phases are two-stage. The single-stage phases are instantiated locally, within the PMIC. The first stages of the two-stage phases are also instantiated locally within the PMIC. These are controlled using a local control loop. The second stages of the two-stage phases are instantiated at a remote location. These stages are controlled using their own independent control loop.

Figure 7:
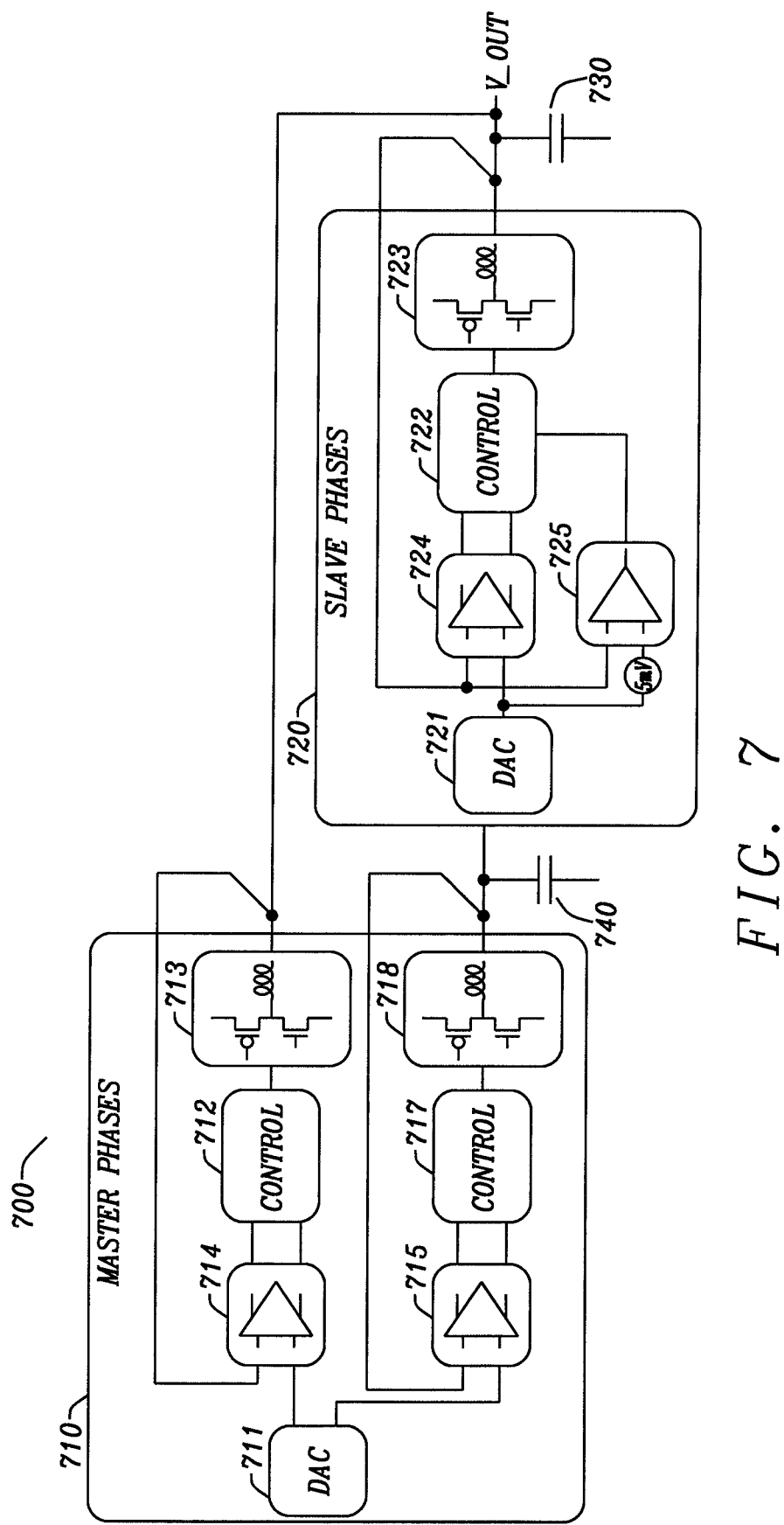
FIG. 7 illustrates an ideal two-chip solution, though not making use of the disclosure as described below, where the two chips are essentially separate systems, and the two DACs are not adequately well matched.

FIG. 7 illustrates an ideal two-chip solution 700, though not making use of the disclosure as described below, where the two chips are essentially separate systems, and the two DACs are not adequately well matched. Master block 710 contains the single-stage phases and the support phases that generate the intermediate voltages in 713 and 718. This block contains DAC 711 to set the target voltages for the master phases. There are amplifiers 714 and 715, which compare the output voltages, across capacitor 730 and capacitor 740 respectively, to the target voltage. The output of the amplifiers is used in control blocks 712 and 717, to determine the duty-cycle of the switching converting on a cycle-by-cycle basis. The slave phases, in second stage 720 of the two-phases, are placed remotely from the master block. These phases have DAC 721 to provide a local target voltage. The slave phases also have comparators 724 and 725, which prevent the slave phases from being active in control 722, until V_OUT is 5 mV below the target voltage. In the actual system, this is impractical, as the two DAC blocks are not adequately well matched.

For the remote phases to operate independently from the main phases, and still regulate correctly in the switching converter system, the switching converter functions as follows. At very low loads, the single-stage phases switch independently, and the remote phases do not switch. Once the load is increased beyond a threshold level, the remote phases begin to switch. The current that the remote phases supply increases as the overall load increases.

The current in all the phases relative to each other are well controlled, such that as the current rises in all the phases, all the phases reach maximum output current at the same point. This can be achieved if all the phases are controlled using a single control block, controlling every phase and having knowledge of the state of every phase. However if interconnect is to be minimized, it can be beneficial not to route control signals between the locations of the local and remote phases of the switching converter.

An alternative system implements the remote phases as a separate system to the local phases of the switching converter. In this case each location is provided with a separate DAC to create a locally generated target voltage. If proportional control were used, the switching converter has finite DC output impedance, and the output voltage falls proportionally to the load current. In this way, as the switching converter is loaded, the phases will increase their output current together. By controlling the offset between the two DAC reference voltages, and the trans-conductances of the control loops of the local and remote phases, it is possible to control the overall behavior of the switching converter and the relative currents of the local and remote sites.

Figure 8:
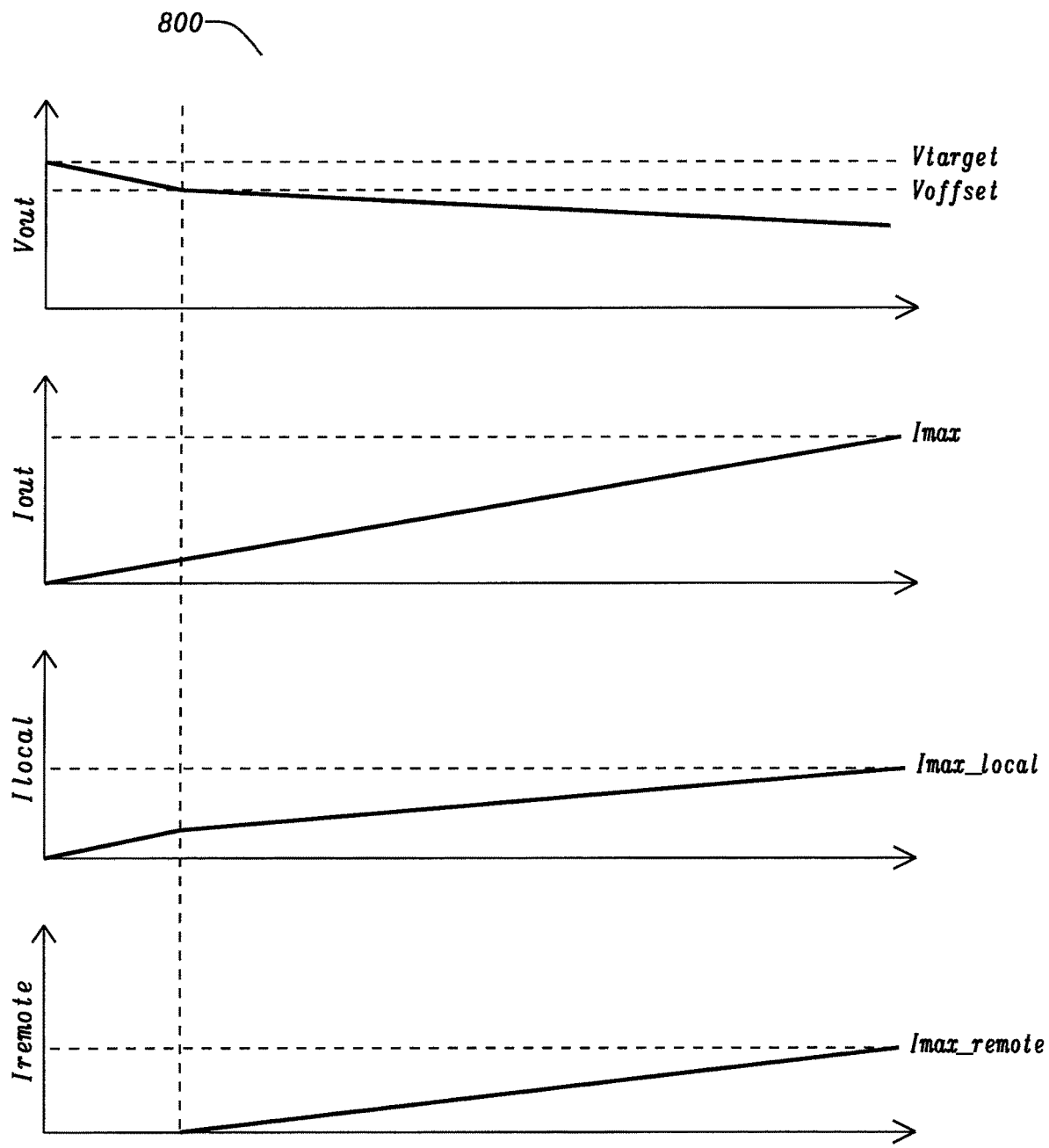
FIG. 8 shows the overall trans-conductance of the switching converter and the contributions from the local and the remote phases, embodying the principles of the disclosure.

FIG. 8 shows 800, the overall trans-conductance of the switching converter and the contributions from the local and the remote phases, embodying the principles of the disclosure. The first panel shows output voltage, VOUT. Target voltage VTARGET for the switching converter is indicated, as well as lower threshold VOFFSET, the target voltage for the remote phases. The second panel shows load current IOUT. As the load current increases to a maximum IMAX, the output voltage falls. Initially only the local phases are active and supply all the load current, in ILOCAL. Once the load is sufficient, the remote phases are enabled in IREMOTE. Both the local and the remote phases then supply the load, where the maximum local and remote currents reach IMAX_LOCAL and IMAX_REMOTE respectively.

The issue with the system as described above is that any offsets between the local and remote sites will cause the switching converter to operate in a way that is non-optimal. If, for example, the switching converter has an effective output impedance of 5 mOhm, a typical offset of 10 mV between the local and remote DACs could equate to a 2 A offset in phase currents.

To make this system more practical it is beneficial to calibrate the local and remote DACs, so that they match with a much finer tolerance. This may be implemented in the present disclosure using an auto-calibration scheme.

The most basic implementation of this scheme is as follows. The single stage phases are started without starting the first-stage pre-regulator of the two-stage phases, so that the intermediate voltage is not yet present. No load is present at this point. The single stage phases settle, and the output is set to the unloaded voltage of the switching converter. Any offsets in the single-stage phases are present in the output voltage. The first-stage phases are enabled and the intermediate voltage charged up. The second stage is then enabled, and the output is not allowed to switch. The switching converter output voltage is sensed by the second-stage phases and used as a reference voltage for an auto-calibration routine. This auto-calibration routine trims the second stage-switching converter control loop, to target a voltage to the voltage of the single-stage phases. If required, an offset may be added in the auto-calibration scheme, to ensure the remote phases do not switch at low loads. Once calibration is complete, the switching converter is allowed to operate as normal, and a load may be applied.

Figure 9:
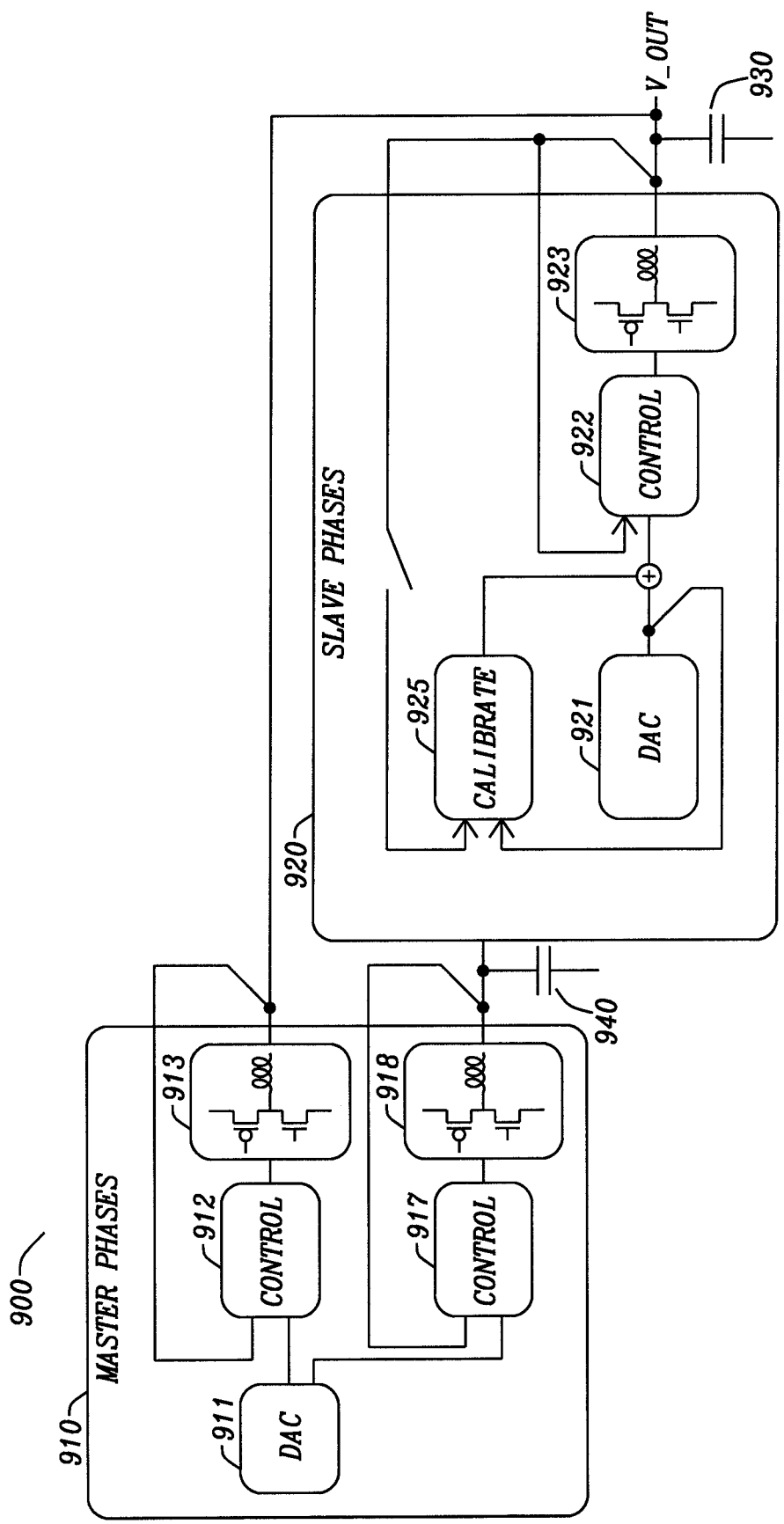
FIG. 9 illustrates a simplified system, where the master phases provide the single-stage phases and the first-stage "pre-regulator" phases for the two-stage phases, embodying the principles of the disclosure.

FIG. 9 illustrates 900, a simplified system, where master phases 910 provide single-stage phase 913 and first-stage pre-regulator phase 918 for two-stage phase 923, embodying the principles of the disclosure. DAC 911 provides control 912 and control 917 with a local target voltage in the master phases of the switching converter. First-stage pre-regulator phase 918 provides an intermediate output voltage, across capacitor 940. When the single-stage phases are turned on, their output is also shared with second-stage phases 920, the slave phases of the switching converter. The second-stage phases may use the common output voltage V_OUT, across capacitor 930, to calibrate their own reference voltage in 925. This may be done by comparing the voltage of DAC 921 with the common output voltage, in second-stage control 922 of the switching converter. When the switching converter has completed auto-calibration, the calibration system is turned off and the switching converter runs normally.

The duration of the auto-calibration stage may be defined by a fixed time window after startup, may be flagged using a calibration signal, or may be terminated by raising a flag. If a signal is used to define the auto-calibration window, the second stage may be re-calibrated at any time in the switching converter's operation. This scheme may allow the output voltage to be changed and the remote phases to be re-calibrated at the new voltage level.

Figure 10:
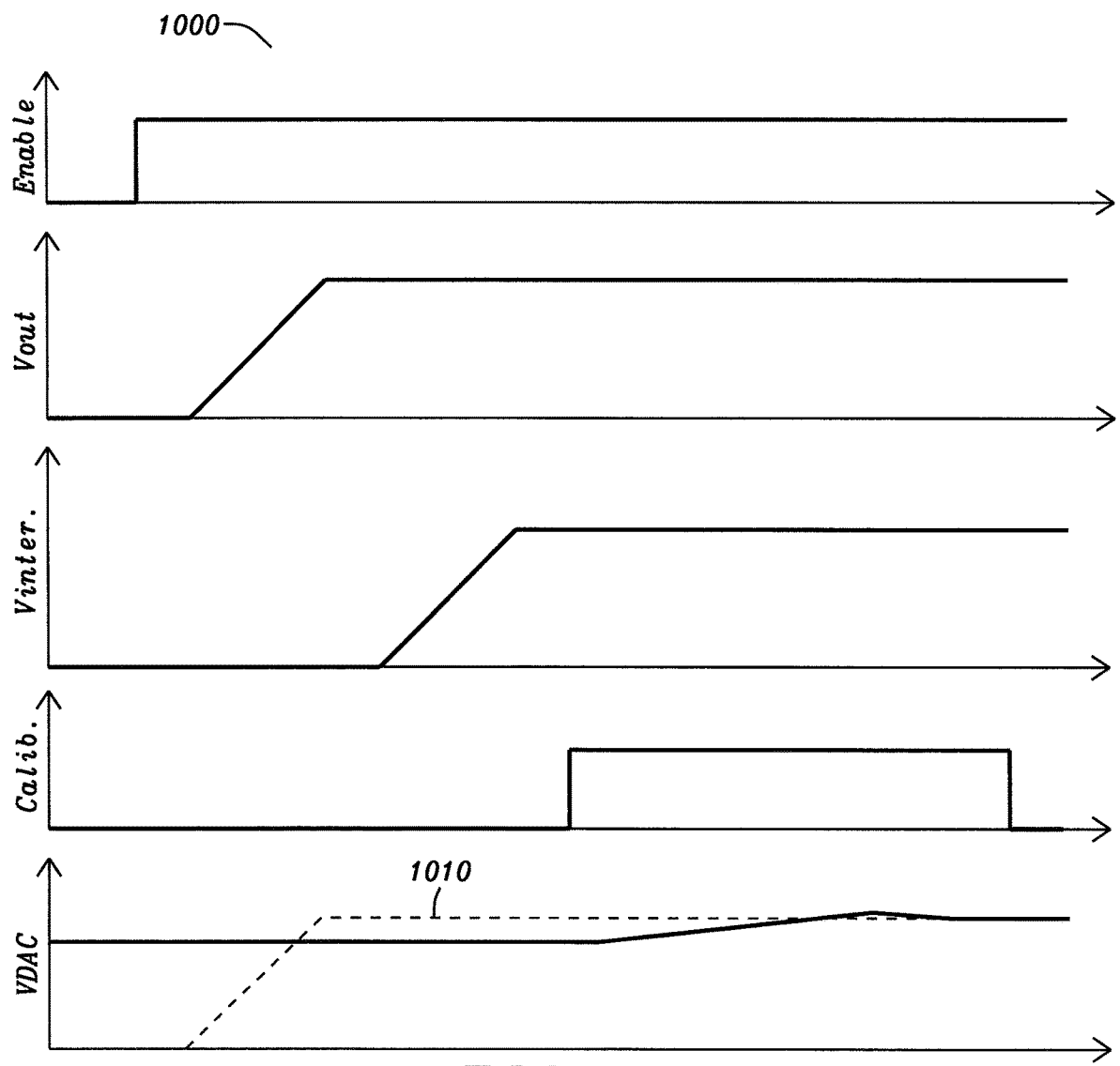
FIG. 10 shows a timing diagram for the calibration window where the DAC voltage of the second-stage phases is calibrated to match the output voltage, embodying the principles of the disclosure.

FIG. 10 shows timing diagram 1000, for the calibration window where the DAC voltage of the second-stage phases is calibrated to match the output voltage, embodying the principles of the disclosure. The switching converter is initially enabled, when enable signal ENABLE goes high. Output voltage VOUT then charges up to the correct level, using the single-stage phases only. Once the output is at the correct voltage, intermediate voltage VINTER is charged up. This starts calibration fixed time window CALIB, in which to complete auto-calibration. During the calibration phase, DAC voltage of the second-stage phases, VDAC, is calibrated to match output voltage 1010. Once the calibration is complete CALIB ends, to terminate the calibration window, and the switching converter runs normally.

Figure 11:
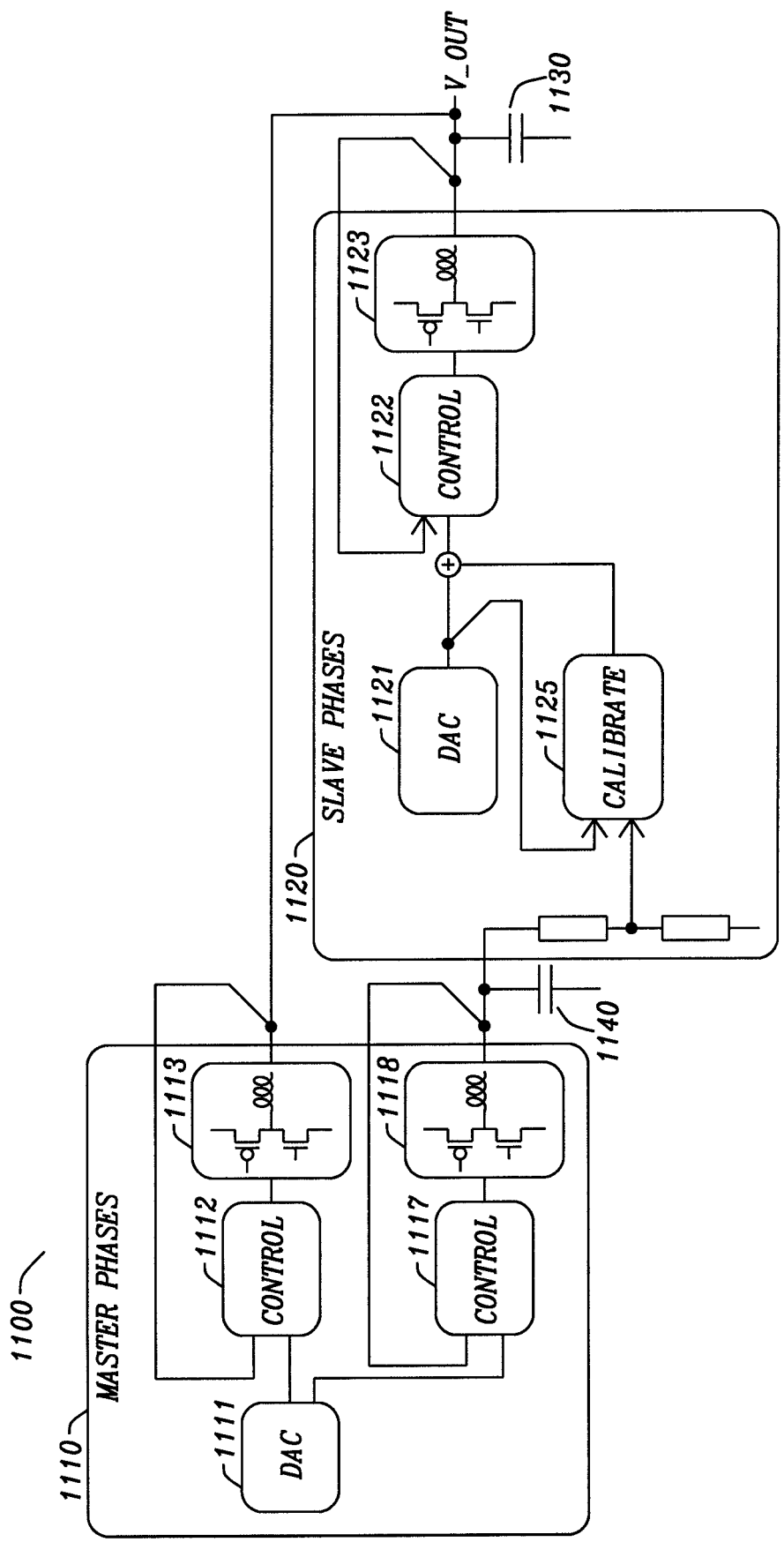
FIG. 11 illustrates a variant of the system, where the auto-calibration uses a voltage derived from the intermediate voltage, embodying the principles of the disclosure.

FIG. 11 illustrates a variant of the system, 1100, where auto-calibration uses a voltage derived from the intermediate voltage for trimming, embodying the principles of the disclosure. In this case the intermediate voltage would be arranged to be a fixed multiple of the target voltage. The switching converter would create a divided-down version of the intermediate voltage and use this for the reference voltage, against which the switching converter would be trimmed.

Master phases 1110 provide single-stage phase 1113 and first-stage pre-regulator phase 1118 for two-stage phase 1123. DAC 1111 provides control 1112 and control 1117 with a local target voltage in the master phases of the switching converter. First-stage pre-regulator phase 1118 provides an intermediate output voltage, across capacitor 1140. When the single-stage phases are turned on, their output is also shared with second-stage phases 1120, the slave phases of the switching converter. So the second-stage phases may use the common output voltage V_OUT, across capacitor 1130, as a reference voltage in second-stage control 1122. The voltage of DAC 1121 is compared with the calibrated intermediate voltage of 1125 in the second-stage control.

For a certain time after the intermediate voltage comes up, the second-stage phases do not switch. In this time the intermediate voltage is divided-down and used as the reference for auto-calibration. Once auto-calibration is complete the switching converter then operates as normal. Another variant would use a dedicated signal wire to carry the reference voltage during calibration. After the calibration window this signal wire could then be used for other functions.

Figure 12:
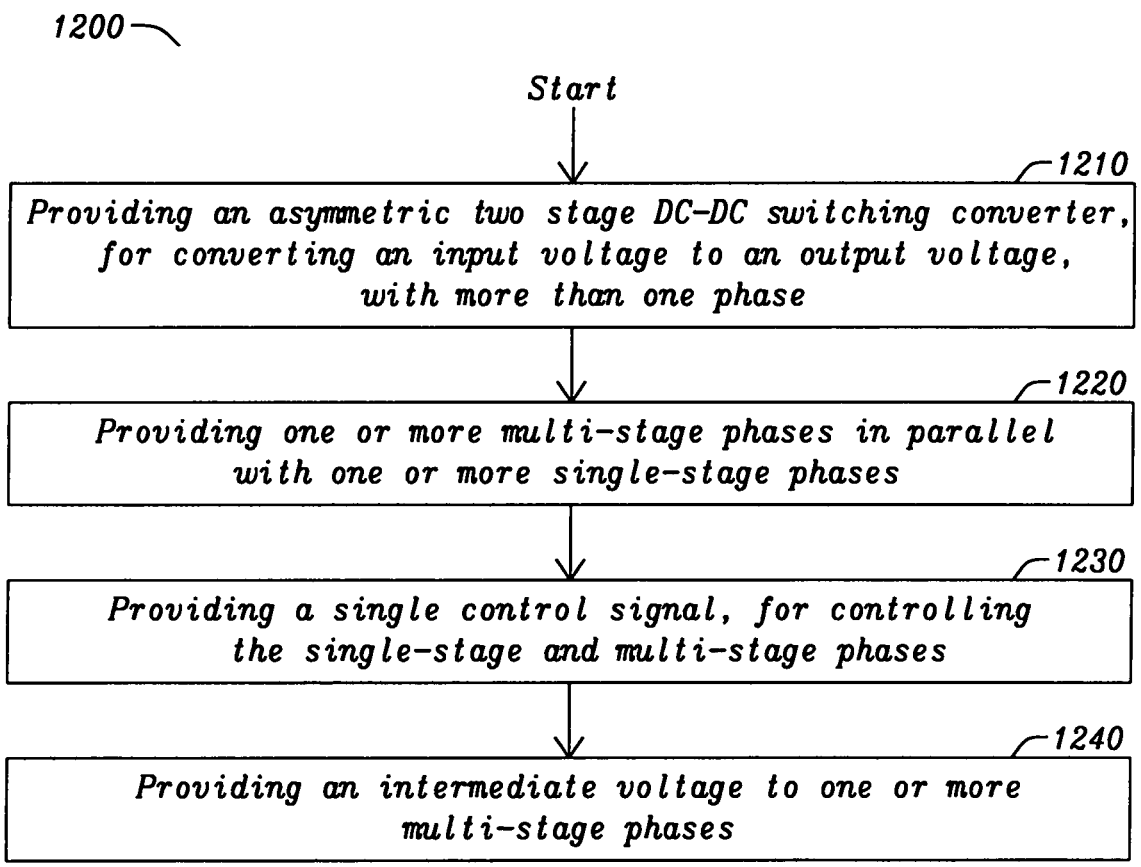
FIG. 12 is a flow chart of a method for an asymmetric two-stage DC-DC switching converter, for converting an input voltage to an output voltage, embodying the principles of the disclosure.

FIG. 12 is flow chart 1200 of a method for operating an asymmetric two-stage DC-DC switching converter, for converting an input voltage to an output voltage, embodying the principles of the disclosure. Step 1210 shows operating the switching converter with more than one phase. Step 1220 shows a switching converter providing one or more multi-stage phases in parallel with one or more single-stage phases. Step 1230 shows a single control signal controlling the single-stage and multi-stage phases. Step 1240 shows an intermediate voltage, between a first and second stage, of one or more multi-stage phases.

The advantages of one or more embodiments of the present disclosure include a practical way of implementing a very fast switching frequency while maintaining high efficiency at low loads. If the high frequency phases were to operate as single-stage architecture, then the switching losses are so great the peak efficiency is unacceptable. If the high frequency phases are operated as a two-stage system with an intermediate voltage, then the switching losses of the high frequency second stage are reduced dramatically. The proposal allows for a DC-DC Switching Converter to have reasonable efficiency at high loads. These high frequency second-stage regulators allow very high performance load transient response. By mixing single-stage phases and two-stage phases, an asymmetric DC-DC Switching Converter can be designed which gives improved transient performance while maintaining low-load efficiency.

Additional advantages include the optional use of an auto-calibration phase for a switching converter with phases in two separate locations. The switching converter output voltage, or an intermediate voltage, may be used as a reference voltage for an auto-calibration scheme. An external reference signal may be used for other functions once the calibration is complete.

While this invention has been particularly shown and described with reference to the preferred embodiments thereof, it will be understood by those skilled in the art that various changes in form and details may be made without departing from the spirit and scope of the invention.

The invention claimed is:

1. An asymmetric two-stage DC-DC switching power converter, for converting an input voltage to an output voltage, comprising:
    more than one phase;
    one or more multi-stage phases in parallel with one or more single-stage phases, wherein each of said single-stage and multi-stage phases comprise buck switching converters,
    wherein said one or more single-stage phases are configured for low-switching frequency and low load operation, and said one or more multi-stage phases are configured for high-switching frequency and for high load operation;
    a common control signal system configured to provide a single control signal, to control said single-stage and multi-stage phases; and
    wherein said one or more multi-stage phases are configured to use an intermediate voltage.

2. The asymmetric two-stage DC-DC switching power converter of claim 1, wherein said multi-stage phases are located in a different silicon die than said single stage phases.

3. The asymmetric two-stage DC-DC switching power converter of claim 1, wherein said switching converter is configured with different phases located on different silicon dies.

4. The asymmetric two-stage DC-DC switching power converter of claim 1, wherein one or more of said single-stage phases is configured to regulate directly from a supply voltage to an output voltage.

5. The asymmetric two-stage DC-DC switching power converter of claim 1, wherein one or more of said single-stage phases are configured to use peak-mode control and one or more of said single-stage phases are configured to use valley-mode control.

6. The asymmetric two-stage DC-DC switching power converter of claim 1, wherein said one or more multi-stage phases are configured to regulate to said intermediate voltage, and to a common output voltage.

7. The asymmetric two-stage DC-DC switching power converter of claim 1, wherein said switching power converter is configured for a number of single-stage phases, with a number of two-stage phases operating from a single first-stage phase providing a common intermediate voltage, and further two-stage phases operating from another first-stage phase providing a separate intermediate voltage.

8. The asymmetric two-stage DC-DC switching power converter of claim 1, wherein said switching power converter is configured with a single first-stage switching converter providing an intermediate output voltage rail to multiple second-stage switching converters, where the second-stage switching converters are partitioned to provide power to different regulated outputs.

9. The asymmetric two-stage DC-DC switching power converter of claim 1, wherein said switching converter is configured for said one or more multi-stage phases to operate at inductance values which are lower than those of said one or more single-stage phases.

10. The asymmetric two-stage DC-DC switching power converter of claim 1, wherein said control signal is a dual-ended, differential signal.

11. The asymmetric two-stage DC-DC switching power converter of claim 1, wherein said multi-stage phases, each comprised of a first and a second stage, and said second stage is physically located remotely from said single-stage and said first stage.

12. The asymmetric two-stage DC-DC switching power converter of claim 1, wherein said switching power converter uses different silicon technologies optimized for said single-stage and said multi-stage phases.

13. The asymmetric two-stage DC-DC switching power converter of claim 1, wherein said control signal is a single-ended voltage, a single ended current, or a number of currents one for each phase to be controlled.

14. The asymmetric two-stage DC-DC switching power converter of claim 1, wherein a first and a second single-stage phase are configured to operate at switching frequencies which are lower than those of a multi-stage phase, and said multi-stage phase is configured to operating at switching frequencies which are higher than those of said single-stage phases.

15. The asymmetric two-stage DC-DC switching power converter of claim 1, wherein second-stage phases are configured to disable at low loads, and to ramp up the output current, as the switching converter load is increased.

16. The asymmetric two-stage DC-DC switching power converter of claim 5, wherein one or more first single-stage phases are configured to operate with inductance which is higher than those of said one or more multi-stage phases, and one or more second single-stage phases are configured to operate at with inductance which are higher than those of said first single-stage phases.

17. The asymmetric two-stage DC-DC switching power converter of claim 5, wherein one or more first single-stage phases are configured to operate at frequencies which are lower than those of said one or more multi-stage phases, and one or more second single-stage phases are configured to operate at frequencies which are lower than those of said one or more first single-stage phases.

18. The asymmetric two-stage DC-DC switching power converter of claim 5, wherein said one or more single-stage phases, and said one or more multi-stage phases, are configured to regulate directly to a common output voltage.

19. The asymmetric two-stage DC-DC switching power converter of claim 11, wherein said second-stage phases are configured to regulate directly to a common output voltage.

20. The asymmetric two-stage DC-DC switching power converter of claim 12, wherein said single-stage phases formed using one of said different silicon technologies are configured to operate with inductance values which are higher than said multi-stage phases that are formed of said different silicon technologies used for said single-stage phases.

21. The asymmetric two-stage DC-DC switching power converter of claim 12, wherein said single-stage phases formed using one of said different silicon technologies are configured to operate at frequencies which are lower than frequencies of said multi-stage phases that are formed of said different silicon technologies used for said single-stage phases.

22. The asymmetric two-stage DC-DC switching power converter of claim 12, wherein one or more of said different silicon technologies are configured to operate at feature sizes which are higher than the feature sizes of one or more of said different silicon technologies.

23. An asymmetric two-stage DC-DC switching power converter, for converting an input voltage to an output voltage, comprising:
  more than one phase;
  one or more multi-stage phases in parallel with one or more single-stage phases, wherein each of said one or more single-stage and one or more multi-stage phases comprise buck switching converters;
  wherein said one or more multi-stage phases are configured to use an intermediate voltage;
wherein second-stage phases in said one or more multi-stage phases are controlled with a separate controller block, from said one or more single-stage phases; and
wherein said second-stage phases are configured to perform an auto-calibration during a startup period of said switching power converter.

24. The asymmetric two-stage DC-DC switching power converter of claim 23, wherein said second-stage phases are configured to perform said auto-calibration using a target voltage from an external reference voltage.

25. The asymmetric two-stage DC-DC switching power converter of claim 23, wherein said second-stage phases are configured to perform said auto-calibration using a target voltage from an intermediate reference voltage.

26. The asymmetric two-stage DC-DC switching power converter of claim 23, wherein said second-stage phases are located in a different silicon die.

27. The asymmetric two-stage DC-DC switching power converter of claim 23, wherein said second-stage phases are configured to perform said auto-calibration using an external reference signal provided on a wire, that may be used for other functions when said auto-calibration is complete.

28. The asymmetric two-stage DC-DC switching power converter of claim 23, wherein said second-stage phases are configured to perform said auto-calibration using a second signal to define a fixed time calibration window, and a flag to terminate said calibration window.

29. A method for operating an asymmetric two-stage DC-DC switching converter, for converting an input voltage to an output voltage, comprising the steps of:
  operating said DC-DC switching converter with more than one phase;
  providing one or more multi-stage phases in parallel with one or more single-stage phases, wherein each of said single-stage and multi-stage phases comprise buck switching converters,
  wherein said one or more single-stage phases operate with low-switching frequency and low load, and said one or more multi-stage phases operate with high-switching frequency and high load;
  providing a common control signal system with a single control signal controlling said single-stage and multi-stage phases; and
  providing an intermediate voltage, to one or more multi-stage phases.

30. The method of claim 29, wherein said one or more multi-stage phases are located on a different silicon die than said one or more single stage phases.

31. The method of claim 29, wherein said switching converter comprises different phases located on different silicon dies.

32. The method of claim 29, wherein one or more of said single-stage phases regulates directly from a supply voltage to an output voltage.

33. The method of claim 29, wherein one or more of said single-stage phases use peak-mode control and one or more of said single-stage phases use valley-mode control.

34. The method of claim 29, wherein said one or more multi-stage phases regulate to an intermediate voltage, and to an output voltage.

35. The method of claim 29, wherein said one or more multi-stage phases operate at inductance values which are lower than those of said one or more single-stage phases.

36. A method for an asymmetric two-stage DC-DC switching power converter, for converting an input voltage to an output voltage, comprises:
  providing more than one phase;
  providing one or more multi-stage phases in parallel with one or more single-stage phases, wherein each of said one or more single-stage and one or more multi-stage phases comprise buck switching converters;
  wherein said one or more multi-stage phases use an intermediate voltage; and
wherein a separate controller block from said one or more single-stage phases controls second-stage phases, in said one or more multi-stage phases; and
wherein said second-stage phases perform an auto-calibration during a startup period, removing any offsets in the system.

37. The method of claim 29, wherein a second-stage phase disables at low loads, and ramps up the output current, as the switching converter load is increased.

38. The method of claim 36, wherein said second-stage phases perform said auto-calibration using a target voltage from an external reference voltage.

39. The method of claim 36, wherein said second-stage phases perform said auto-calibration using a target voltage from an intermediate reference voltage.

40. The method of claim 36, wherein said second-stage phases are located in a different silicon die.

41. The method of claim 36, wherein said second-stage phases perform said auto-calibration using an external reference signal on a wire that may be used for other functions when said auto-calibration is complete.

42. The method of claim 36, wherein said second stage phases perform said auto-calibration using a signal that defines a fixed time calibration window, and a flag that terminates said calibration window.

* * * * *